United States Patent [19]

Boxenhorn

[11] Patent Number: 4,699,006
[45] Date of Patent: Oct. 13, 1987

[54] VIBRATORY DIGITAL INTEGRATING ACCELEROMETER

[75] Inventor: Burton Boxenhorn, Chestnut Hill, Mass.

[73] Assignee: The Charles Stark Draper Laboratory, Inc., Cambridge, Mass.

[21] Appl. No.: 826,133

[22] Filed: Feb. 4, 1986

Related U.S. Application Data

[63] Continuation-in-part of Ser. No. 591,007, Mar. 19, 1984, Pat. No. 4,598,585.

[51] Int. Cl.$^4$ ............................................. G01P 15/08
[52] U.S. Cl. ................................................. 73/517 AV
[58] Field of Search .......... 73/517 R, 517 B, 517 AV; 310/329

[56] References Cited

U.S. PATENT DOCUMENTS

| | | | |
|---|---|---|---|
| 3,498,138 | 3/1970 | Stewart | 73/517 B |
| 4,071,838 | 1/1978 | Block | 73/517 R |
| 4,182,187 | 1/1980 | Hanson | 73/517 B |
| 4,306,456 | 12/1981 | Maerfeld | 73/517 R |
| 4,454,771 | 6/1984 | Shimazoe et al. | 73/862.68 |
| 4,483,194 | 11/1984 | Rudolf | 73/517 B |

FOREIGN PATENT DOCUMENTS

| | | |
|---|---|---|
| 1560537 | 2/1980 | United Kingdom . |
| 2121953 | 1/1984 | United Kingdom . |
| 21303735 | 5/1984 | United Kingdom . |

*Primary Examiner*—John Chapman
*Attorney, Agent, or Firm*—Lahive & Cockfield

[57] ABSTRACT

An accelerometer transducer has a base holding a sheet normal to an input axis. The sheet is suspended from the base by a first spring arrangement for oscillatory motion in the way of limited angular excursions about a central axis lying in the sheet. A weight is spring-suspended from the sheet in a manner permitting displacement of the center of gravity of the weight along the input axis. Acceleration along the input axis varies the moment of inertia of the assembly consisting of the sheet and the weight about the central axis, altering the frequency of oscillatory motion by an amount functionally related to the magnitude of the acceleration. The sheet is driven at its characteristic frequency, and its frequency of oscillation is measured. In a preferred embodiment, a first transducer includes a weight suspended offset from the sheet in a first direction along the input axis, and a second transducer includes a weight offset from the sheet in the opposite direction along the input axis. The change of oscillatory frequency of the second transducer is subtracted from that of the first transducer to develop an output quantity linearly related to the acceleration. In a preferred embodiment, the sheets, springs and weights are micromechanical devices fabricated by semiconductor fabrication techniques. Electrostatic driving elements for driving the sheet, and a capacitive pick-off for sensing its vibration are also shown.

20 Claims, 13 Drawing Figures

4,699,006

VIBRATORY DIGITAL INTEGRATING ACCELEROMETER

RELATED APPLICATIONS

This application is a continuation-in-part of application Ser. No. 591,007 filed Mar. 19, 1984, now U.S. Pat. No. 4,598,585.

TECHNICAL FIELD

The present invention relates to accelerometers, to accelerometer transducers for developing a manifestation indicative of the magnitude of acceleration along a particular axis, and to vibratory accelerometers in particular.

BACKGROUND OF THE INVENTION

This invention relates to inertial sensors, and in particular to accelerometers and vibratory gyroscopes.

Vibratory gyroscopes provide a measure of an angular rate impressed on a vibrating element by producing a signal representative of torques on the vibratory element due to the impressed angular rate.

In the prior art, vibratory gyroscopes and accelerometers use a tuning fork, vibrating beam, or wire, as the vibrating element. However, the prior art gyroscopes and accelerometers have not proven to be easily adapted to miniaturization, or mass production.

It is known in the prior art to construct a vibrating beam accelerometer, comprising a resonant piezoelectric beam, which is sensitive to acceleration along the vibrating longitudinal axis of the beam. Acceleration along the axis shifts the resonant frequency, and the frequency shift is taken as a measure of the acceleration. Also known are vibrating string accelerometers, operative along a similar principal, in which the resonant member is a vibrating wire under tension. Acceleration along the axis of the wire relieves the tension, which again shifts the natural resonant frequency. Appropriate instrumentation converts the frequency shift to a measure of acceleration.

It has also been proposed to construct an accelerometer or seismometer by forming a micromechanical structure having a weight disposed on a elastic membrane or a pair of opposing elastic beams, as in United Kingdom patent application No. 2,130,373 published May 31, 1984. In that device, displacement of the weight manifests the acceleration along the direction of displacement.

Each of the foregoing constructions results in an instrument, the basic mechanical portion of which is simple. However, most such designs entail structures or adaptive circuitry which is not easily amenable to micro-miniaturization and mass production in a unitary chip form.

It is an object of this invention to provide an inertial sensor adapted for small geometry configurations.

Another object is to provide an inertial sensor which may be easily constructed, using mass production techniques.

Another object is to provide a novel structure for a sensor for providing a manifestation of the acceleration along an axis.

Another object is to provide a sensor having a digital output which is directly proportional to, or a known function of, the acceleration along an axis.

Another object is to provide a sensor having improved resolution.

Another object is to provide a sensor in the form of a micromechanical device.

Another object is to provide a sensor having integrally fabricated driving and sensing circuitry thereon.

Another object is to provide a sensor adaptable for directly integrating the sensed acceleration and providing a digital output indicative thereof.

SUMMARY OF THE INVENTION

Briefly, the invention is an inertial sensor having an input (Z) axis. The sensor includes a sheet member and an associated base member. The base member is adapted to support the peripheral region of the sheet member in a plane perpendicular to the Z axis, where that plane includes a first (X) reference axis and a second (Y) reference axis, and where the X and Y axes are mutually perpendicular intersecting with the Z axis at a common point. The sheet member encloses a first pair of opposed C-shaped void regions disposed symmetrically about the Y axis and the common point. The portions of the sheet member between the opposed ends of the void regions are flexible, providing flexures.

In an accelerometer form of the invention, the portion of the sheet member interior to the void regions has a mass imbalance across the Y axis, i.e., one side has more mass than the other. Sensors are adapted to provide signals representative of the angular position of the interior position of the sheet member about the Y axis. Those signals are representative of the acceleration of the sensor in the direction of the Z axis. In some forms, those signals may be used to drive torquers which dynamically maintain the interior element of the sheet member in the X-Y plane, where the return torques are representative of the sensor acceleration.

In another accelerometer form of the invention, a primary portion of the sheet member interior to the first C-shaped void regions encloses a second pair of opposed C-shaped void regions. The C-shaped void regions of the second pair are disposed symmetrically about the X-axis and the common point, with flexure portions between the opposed ends of the second pair of void regions, so as to pendulously suspend a secondary portion of the sheet, interior to said second pair, for angular motion about the X axis. The secondary portion of the sheet has a mass imbalance across the X axis, with its center of gravity lying outside the nominal plane of the sheet, so that acceleration along the Z-axis alters the moment of inertia about the Y axis of the entire assembly comprising the primary and secondary portions of the sheet. By driving the primary portion of the sheet at its natural resonant frequency about its flexures, and measuring changes in this natural frequency of its motion, an output proportional to acceleration along the Z-axis is developed.

More generally, an accelerometer transducer has a base adapted to peripherally support a peripheral region of the sheet in a plane normal to an input (z) axis. An interior portion of the sheet is suspended from the base by a first spring arrangement adapted to permit oscillatory motion of that portion in the way of limited angular excursions about a central axis lying in the plane of the peripheral support for the sheet. A weight is spring-suspended from the sheet in a manner permitting acceleration-induced displacement of the center of gravity of the weight, such displacement having a component along the input axis. Acceleration along the input axis varies the moment of inertia of the assembly consisting of the sheet and the weight about the central axis, altering the frequency of oscillatory motion by an amount functionally related to the magnitude of the acceleration. Means are provided to drive the sheet at its characteristic frequency and to measure its frequency of oscillation.

In a preferred embodiment, a first transducer includes a weight suspended offset from the sheet in a first direction along the input axis, and a second transducer includes a weight offset from the sheet in the opposite direction along the input axis. The change of oscillatory frequency of the second transducer is subtracted from that of the first transducer to develop an output quantity approximately linearly related to the acceleration. In a preferred embodiment, the sheets, springs and weights are micromechanical devices fabricated by semiconductor device fabrication techniques. Fabrication techniques for silicon and for silicon oxide embodiments are disclosed. Electrostatic driving means for driving the sheet, and the capacitive pick-off means for sensing its vibration are also shown.

In general, in the gyroscope form of the invention a generally planar gyroscope is arranged to produce, in combination, an oscillatory momentum vector and a measurable oscillatory torque output in response to an impressed angular input.

In preferred embodiments, the sheet member of gyroscope has at least one planar inner element arranged to oscillate about the Y axis at a selected frequency. The inner element is also arranged to tilt about the X axis in response to an angular rate impressed about the input (Z) axis. The gyroscope has at least one outer planar driving element, arranged to be driven in an oscillatory manner with limited excursions about the Y axis at the selected frequency (driven, for example, by an electrostatic or electromagnetic forcer). The driving element is coupled to the inner element so that the oscillatory motion of the driving element produces oscillatory motion of the inner element. Position sensors provide signals representative of the angular position of the inner element relative to X axis, which in turn are representative of angular rates impressed on the device about the Z axis. In various embodiments, the vibratory gyroscope may have a plurality of inner elements coupled to its driving element, or alternatively, may have a single inner element coupled to its driving element.

The planar geometry of the invention permits inertial sensors to be produced from sheets of material using inexpensive mass production techniques. In some embodiments, the sensors may be formed by stamping a single sheet of material such as steel or aluminum. In other embodiments, minature inertial sensors may be constructed from a thin layer of a dielectric material (such as $SiO_2$, $Si_3N_4$, or $(SiO_2)_x(Si_3N_4)_y$) on a silicon substrate using conventional semiconductor etching techniques. Particularly using the latter technique, many minature small geometry inertial sensors may be constructed on a single semiconductor chip, permitting the economic use of redundant inertial sensors with consequent greatly improved reliability and performance for inertial guidance systems. Further, the size geometry of the inertial sensors of the present invention permits the use of electrostatic control by which relatively low voltage signals can provide relatively large driving forces and output signals.

BRIEF DESCRIPTION OF THE DRAWING

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
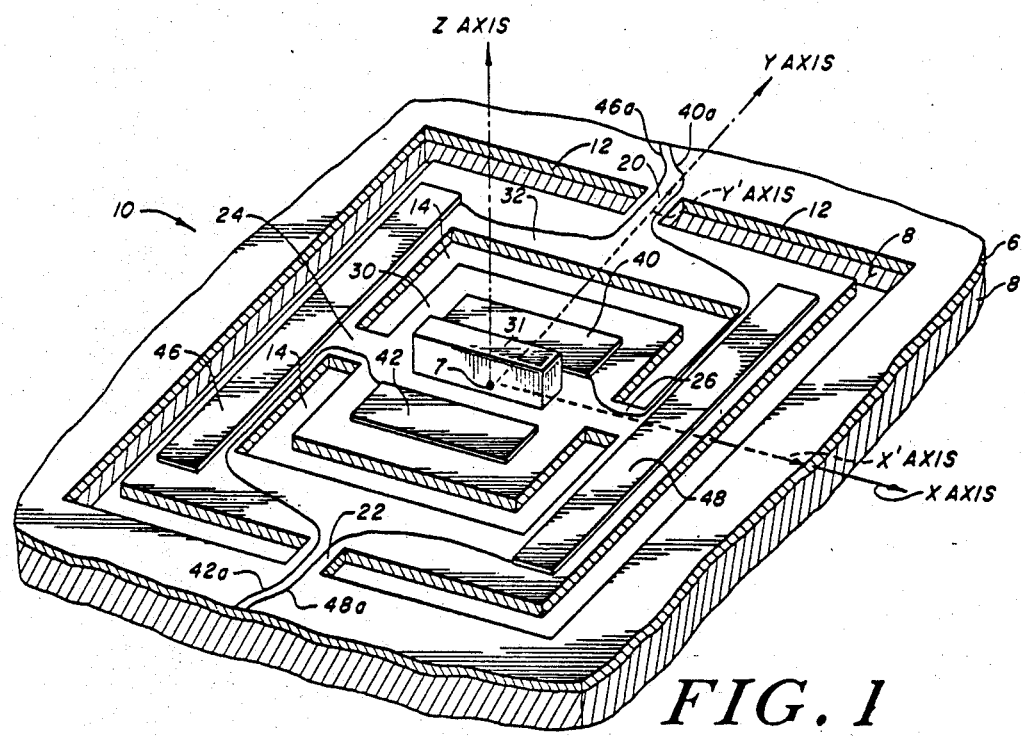
FIG. 1 is a perspective view of an planar inertial sensor embodying the present invention in the form of a vibratory gyroscope.
Figure 2:
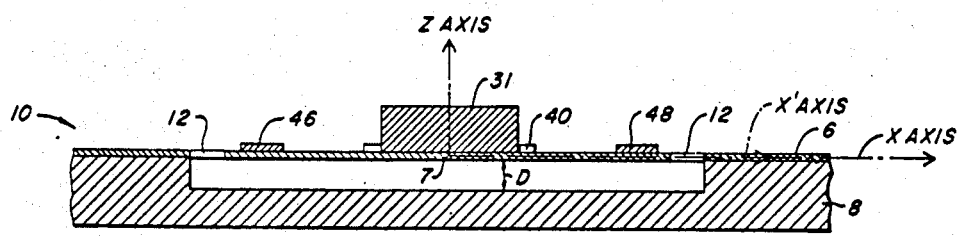
FIG. 2 is a cross-sectional view of the embodiment of FIG. 1, taken along the X axis.
Figure 3:
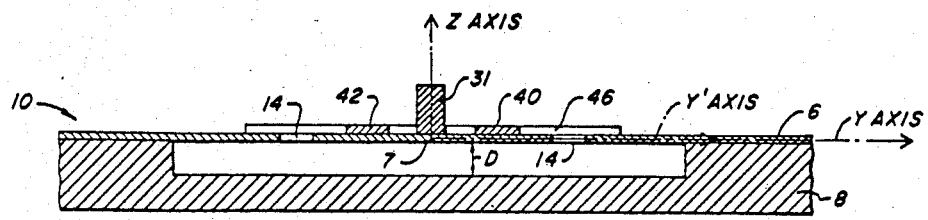
FIG. 3 is a cross-sectional view of the embodiment of FIG. 1, taken along the Y axis.

FIGS. 1–3 show a gyroscope 10 in accordance with the present invention. The gyroscope 10 includes a nominally planar, relatively thin sheet member 6 with its perimeter being positioned in a plane defined by perpendicular intersecting reference axes X and Y. An input (Z) axis orthogonal to the X and Y axes, intersects those axes at a common point 7. The sheet member 6 is supported at the edges of gyroscope 10 so that the portions of sheet member 6 interior to those edges is positioned over and spaced apart from a substrate (or base member) 8. In alternate embodiments, the base member may not underlie the sheet member 6, except at the peripheral supports.

In the preferred embodiment, the sheet member 6 includes a first pair of opposed, C-shaped void regions 12 and a second pair of opposed, C-shaped void regions 14. The term "C-shaped" refers generally to the shape of the respective regions each of which includes a portion extending approximately 180 degrees about a central point (for example, "C-shaped" includes a semi-circle, which extends 180 degrees about its center; C-shaped also includes two linear segments joined at their ends, like a "V"). In the illustrated embodiment, the void regions of pair 12 are substantially congruent, as are the void regions of pair 14. The void regions 12 are larger than the void regions of pair 14, with the void regions of pair 12 being disposed symmetrically about the Y axis and the common point 7, and the void regions of pair 14 being disposed symmetrically about the X-axis and common point 7. In other forms of the invention, it is not necessary that the opposed void regions be congruent.

The portions of the sheet member 6 between the opposed ends of the void regions of pair 12 (denoted by reference designations 20 and 22 in FIG. 1) and the portions of the sheet member 6 between the opposed ends of the void regions of pair 14 (denoted by reference designations 24 and 26 in FIG. 1) are relatively flexible, forming a flexure joining the portion of member 6 exterior to the void regions 14, with the portion interior to the void region 14. Consequently, the sheet member on one side of each of those portions is coupled to the sheet member on the other side of the respective portions in a manner permitting limited rotational motion of one side with respect to the other side about the axis passing through those portions.

With this configuration, the void regions of pair 14 and flexure portions 24 and 26 of sheet 6 define an inner, or inertial, element 30; that is, the element 30 is generally interior to the void regions of the first pair 14. The portion of sheet 6 bounded by the void regions of pair 12, flexure portions 20 and 22, the void regions of pair 14, and flexure portions 24, 26 define a driving element 32 of the gyroscope 10; that is, the element 32 is generally interior to the void regions of pair 12. The driving element 32 may undergo limited angular displacements about the Y-axis with respect to the perimeter of sheet 6 (which is supported at its edges by base member 8) as permitted by the flexure portions 20 and 22. Similarly, the inner element 30 may may undergo limited angular displacements about the X-axis with respect to the driving element 30 as permitted by the flexure portions 24 and 26.

With this configuration, the driving element 32 is generally planar, lying in a plane defined by the Y axis and an X' axis (which is perpendicular to and intersects the Y axis at the common point 7. The inner element 30 is also generally planar, lying in a plane defined by the X' axis and a Y' axis (which is perpendicular to and intersects the X' axis at the common point 7). In FIGS. 1–3, the X and X' axes are shown to be coaxial as are the Y and Y' axes. However, in operation, the X' axis is angularly offset with respect to the X axes in a generally periodic manner, and the Y' axis is angularly offset with respect to the Y axis in a manner related to an angular rate impressed on gyroscope 10.

In the present embodiment, inner element 30 includes an elongaged bar 31 on its surface extending in the X' direction. As discussed below, this bar 31 is merely an exemplary form for attaining a desired relation between the moments of inertia of element 30 about the X', Y' and Z' axes which are necessary to provide a desired sensitivity of gyroscope 10.

Generally the sheet member 6 is electrically non-conductive. As shown, the inner element 30 includes electrically conductive sensitive regions 40 and 42 on the upper surface of that element 30. In alternative embodiments, the regions 40 and 42 may be positioned on the lower surface of element 30, or in both the upper and lower surfaces of that element 30. The regions 40 and 42 are electrically connected to external electrical circuitry by conductive paths (denoted by reference designations 40a and 42a). The sensing regions 40 and 42 are adapted to oppose planar conductive elements fixed with respect to the base member 8. Where the base member 8 is electrically conductive, that member 8 may establish the conductive element opposite to regions 40 and 42. (In other embodiments, discrete conductive members may be fixed with respect to member 8). Together, the pairs of opposed conductive elements provide a capacitive pick-off position transducer having a capacitance representative of the angular orientation of the inner element 30 about the X-axis (i.e. the angle formed by the Y and Y' axes).

The drive member 32 includes two conductive drive regions 46 and 48 on its upper surface. As with regions 40 and 42 in alternate embodiments, regions 46 and 48 may be on the lower surface of element 32, or on both the upper and lower surfaces of element 32. The regions 46 and 48 are electrically connected to external circuitry by conductive paths (denoted by reference designations 46a and 48a). The drive regions 46 and 48 are adapted to oppose planar conductive elements fixed with respect to the base member. Where the member 8 is conductive, that member may serve as the conductive elements opposite elements 46 and 48. Together, those pairs of opposed elements may be selectively controlled to provide electrostatic forces for driving the drive element 32 in oscillatory motion about the Y-axis (i.e. so that the angle formed by the X' and X axes is an oscillatory function of time).

Figure 4:
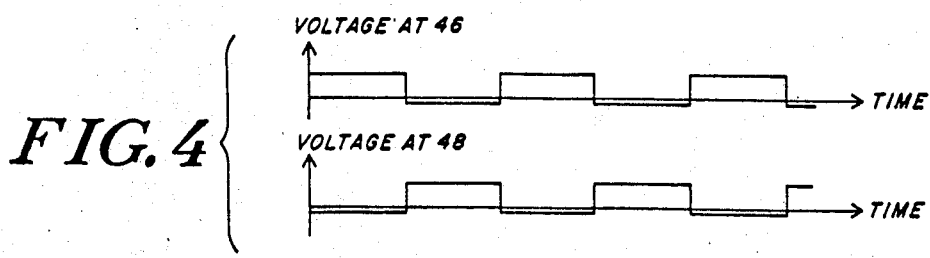
FIG. 4 shows the drive waveforms for the drive element of the gyroscope of FIGS. 1–3.

A signal generator is adapted to provide a first drive signal (which is applied across the capacitor formed by drive region 46 and its opposing conductive driving element), and a second drive voltage (which is applied across the capacitor formed by drive region 48 and its opposing conductive driving element). The first and second drive voltage signals are periodic and have the same fundamental frequency (and, thus identical periodicity), and a non-zero d.c. component, where the first drive voltage signal is shifted in phase by 180 degrees with respect to the second drive voltage signal. FIG. 4 shows exemplary drive voltage signals which are generally rectangular. If bipolar signals are used, those signals are asymmetric, e.g., as shown in FIG. 4.

In operation, because the drive signal alternates electrostatic forces between the conductive elements of the respective capacitors and is responsive to these forces, the drive element 32 oscillates about the Y-axis at the repetition frequency of the voltage driving signals. This oscillatory motion of the driving member 32 is coupled to the inner element 30 (which in turn also oscillates about the Y axis) by way of the flexure portions 24 and 26. In small geometry configurations, where the distances between regions 46 and 48 and their associated opposed conductive elements are small, substantial electrostatic forces may be developed using relatively low driving voltages. In alternative forms of the invention, corresponding oscillatory motion of elements 30 and 32 about the Y axis may be established by other techniques, for example using electromagnetic forces.

With the elements 30 and 32 oscillating in that manner, thereby establishing an oscillatory momentum vector, an impressed angular rate about the Z axis causes a gyroscopic torque which tilts the inner element 30 out of the plane of the drive element 32 by an angle (corresponding to the angle between the Y and Y' axes) proportional to the magnitude of the impressed angular rate.

The sensitivity of the gyroscope 10 at resonance is approximately:

$$\theta_{1x} = \frac{\theta_{2y}(I_{1x} + I_{1y} - I_{1z})/I_{1x}}{2w_n DR_{1x}}$$

where $\theta_{1x}$ is the tilt of inner element 30 measured with respect to the X-Y plane:

$I_{1x}$ is the moment of inertia of the inner element 30 about the X′ axis;

$I_{1y}$ is the moment of inertia of inner element 30 about the Y′ axis;

$I_{1z}$ is the moment of inertia of inner element 30 about the Z′ axis;

$\theta_{2y}$ is the maximum angular displacement of the drive element 32 about the Y axis;

$w_n$ is the resonant frequency of gyroscope 10;

$DR_{1x}$ is the damping ratio of the inner element 30;

$W_z$ is the angular input rate about the Z-axis.

Thus, the sensitivity proportional to $(I_{1x}+I_{1y}-I_{1z})/I_{1x}$, where $I_{1x}$, $I_{1y}$ and $I_{1z}$ are the moments of inertia of the inner element 30 about the X′, Y′ and Z′ axes, respectively. In order to maximize sensitivity, the inner element 30 should be shaped to maximize that relation of the moments of inertia. In the illustrated embodiment of FIGS. 1-3 (where element 20 is a thin sheet), a bar 31 extending along the X′ axis is positioned on element 30. In other embodiments, the element 30 may be alternately shaped, particularly to provide the relation of the X′, Y′ and Z′ moments of inertia to attain a desired sensitivity.

In a preferred form of the invention, by way of example, the gyroscope 10 has the general configuration shown in FIGS. 1-3, where the sheet member 6 is a 1.0 micron thick layer of silicon dioxide supported at its edges by a silicon substrate 8. The central portion of sheet member 6 (including inner element 30 and drive element 32) is separated from the substrate 8 by 8.7 microns in the Z direction (shown as dimension D in FIGS. 2 and 3). The inner element 30 is rectangular having dimensions 125 microns (in the Y direction) by 125 microns (in the X direction), and the bar 31 (centered over the X axis) is gold and has dimensions of 15 microns in the Z′ direction, 12.5 microns in the Y′ direction and 105 microns in the X′ direction. The drive element 32 is substantially a 50 micron wide "rectangular annulus" (as shown), having outer dimensions 250 microns by 250 microns, where the regions 46 and 48 are each 125 microns (in the Y direction) by 40 microns (in the X direction). With this configuration, a 10 volt driving voltage at a frequency 1000 Hz produces an output sensitivity of approximately 46 millivolts/rad-sec with an output angle ($\theta_{1x}/W_z$) of 4 arc-min/rad/sec.

In the preferred embodiment, the gyroscope 10 is constructed from a p-type silicon wafer typically 300 microns thick using conventional photolithography and semiconductor processing operations. A high concentration boron (p+) diffusion is made in those areas where an etch stop is required. Next an epitaxial layer is grown approximately 10 microns in thickness. The thickness of this layer determines the spacing from the sheet layer 6 to the substrate 8. At this point, on chip electronics are fabricated on a remote area of the substrate. Next the sheet layer 6 is thermally grown to a thickness of about 1 micron by oxidizing the surface of the epitaxial layer. Several steps of selective growth, etch back, and regrowth are required to obtain the desired flexure thickness of the various regions of sheet layer 6, which contains the inner element 30, the drive element 32, and flexures 20, 22, 24 and 26. The bar 31 is constructed subsequently using plating or other techniques.

The wafer is then coated with metal (typically chromium-gold) and patterned to form electrodes 40, 42, 46, 48 and metal connections to the on-chip circuitry. The next step is to pattern and etch through layer 9 ($SiO_2$) to form the C-shaped void regions. The wafer is then etched in a resistivity dependent etch (for example, ethylene diamine pyrochatecol and water). This etchant etches through the epitaxial layer stopping at the p+ substrate diffusion and leaving the $SiO_2$ plate 6 suspended by the region 22 and 24. The wafer is cleaned, dried and sawed apart to form individual gyroscope elements. These elements may then be conventionally packaged, with the on-chip circuitry being wire bonded to the package leads.

In alternative embodiments, a separate cap member may be positioned over and spaced apart from sheet member 6 and joined to sheet member where that member is supported by base member 8. In this configuration, drivers and sensors (electromagnetic or electrostatic) may be established in a similar manner to that described above, so that the inertial sensor may operate with the sheet member dynamically restrained to the X-Y plane.

In other alternative embodiments, the sheet member 6 may be stamped from a single sheet material, such as aluminum or steel, affixed at its edges to a peripheral support element. In this form, the bar 31 can be from a portion of the sheet member which is bent 90 degrees out-of-plane, or by attaching a suitable shaped member. The drives or sensors, or both types of elements may be either capacitive or electromagnetic, or mixed.

It will be understood that in the semiconductor material embodiment of the invention, additional circuitry may be incorporated in the semiconductor wafer (or chip) using conventional integrated circuit techniques, providing a small geometry planar vibratory gyroscope with integral supporting electronic circuitry. In such configurations, highly efficient packaging may be attained. Moreover, multiple gyroscopes may be constructed and interconnected on a single wafer (or chip) with circuitry adapted to permit redundant operation, thereby increasing overall system reliability.

Figure 5:
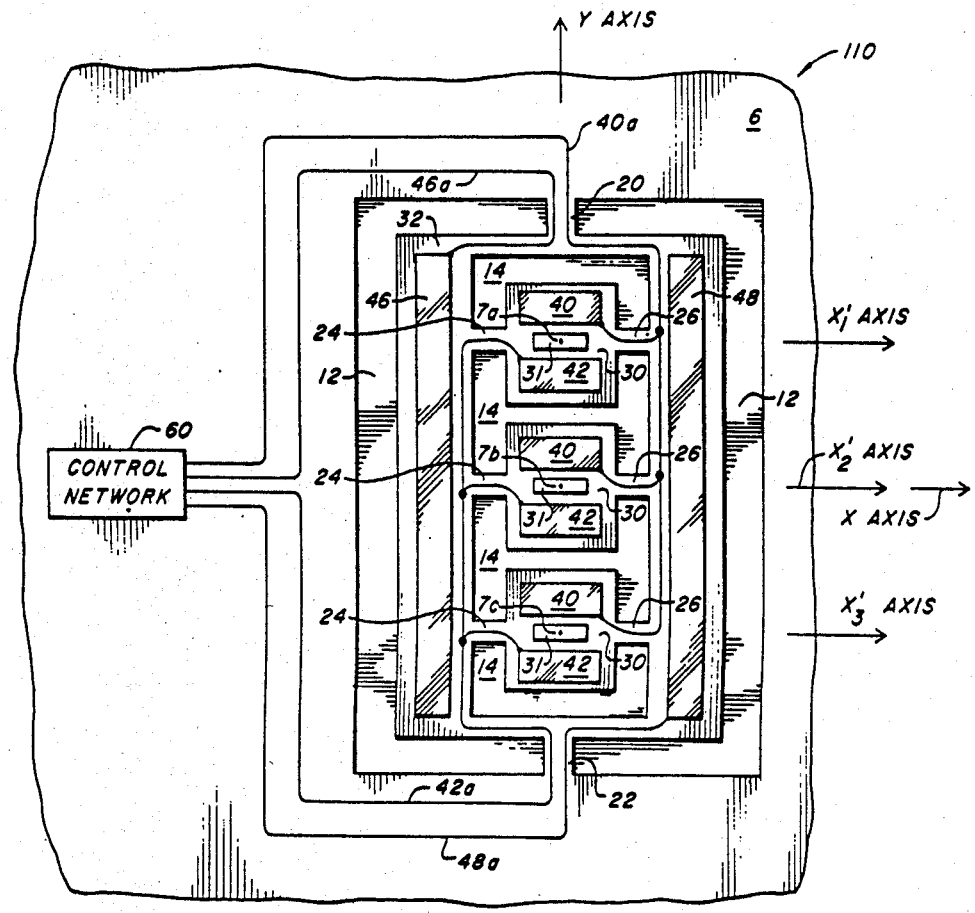
FIG. 5 is a plan view of another embodiment of the invention.

FIG. 5 shows a plan view of an alternative embodiment 110 of the present invention. The gyroscope 110 is generally similar to the embodiment of FIG. 1 except that the drive member includes three inner members, each arranged to tilt about one of three parallel (X′$_1$, X′$_2$, X′$_3$) axes which are all perpendicular to the Y axis and intersect that axis at a respective one of central points 7a, 7b and 7c. In alternative embodiments, a different number of inner members may be used. In FIG. 5, elements corresponding to elements in the FIG. 1 configuration are denoted by identical reference designations. Further, the portion of substrate 8 underlying the void regions 12 and 14 is shown with cross-hatched lines. As illustrated in FIG. 5, the drive element 32 (and thus the X′$_1$, X′$_2$, and X′$_3$ axes) and the inner element 30 (and thus the entire sheet number 6) are illustrated in the X-Y plane, although in operation, these elements are generally angularly offset from the illustrated position.

In the configuration of FIG. 5, each of the inner elements 30 is defined by a pair of opposed C-shaped void regions disposed symmetrically about one of the three central points (7a, 7b and 7c) and one of the X′$_1$, X′$_2$, and X′$_3$ axes (as shown). It will be understood that as defined herein, the term "C-shaped" includes the void regions having the illustrated cross-hatched which define the innermost inner member 30 in FIG. 5. In gyroscope 110, the three conductive regions 46 are connected together by conductive path 46a to establish (together with the underlying conductive substrate 8) three parallel capacitive pick-offs. The three conductive regions 48 are similarly connected to conductive path 48a. With this configuration, the capacitive pick-offs are highly sensitive to angular input rates about axes parallel to an axis perpendicular to the Y axis and the X axis.

As shown in FIG. 5 the conductive regions 40a, 42a, 46a and 48a are connected to the central network 60 (which may be integrated into the chip using conventional integrated circuit technology) which controls the operation of gyroscope 110.

Figure 6:
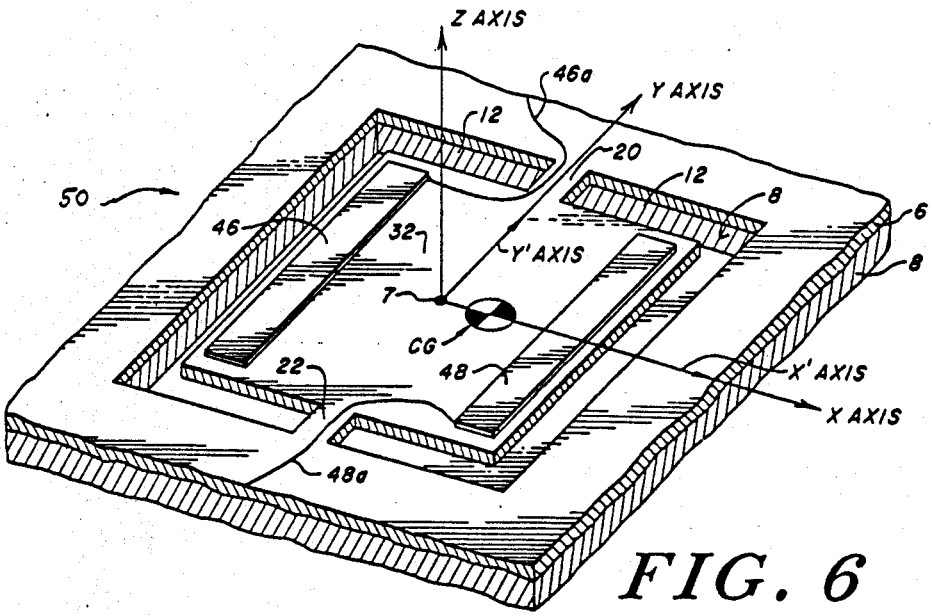
FIG. 6 is a plan view of a planar inertial sensor embodying the present invention in the form of an accelerometer.

FIG. 6 shows yet another inertial sensor according to the present invention, in the form of an accelerometer 50. Accelerometer 50 is similar to the gyroscope 10 of FIG. 1, except that there are not elements corresponding to void regions 14, regions 24, 26 and conductive regions and leads 40, 40a, 42 and 42a, and except that element 30 has more mass on the portion on one side of the Y axis then on the other, thereby, establishing a mass imbalance about the Y axis. This mass imbalance is indicated by the center of gravity symbol CG in FIG. 6. Otherwise, the elements of accelerometer 50 are the same as in gyroscope 10. In operation, the angular displacement of element 30 about the Y axis, as sensed using conductive regions 40 and 42, provides a measure of the acceleration along the Z axis. In this embodiment, the X and Y axes are interchangeable.

Figure 7:
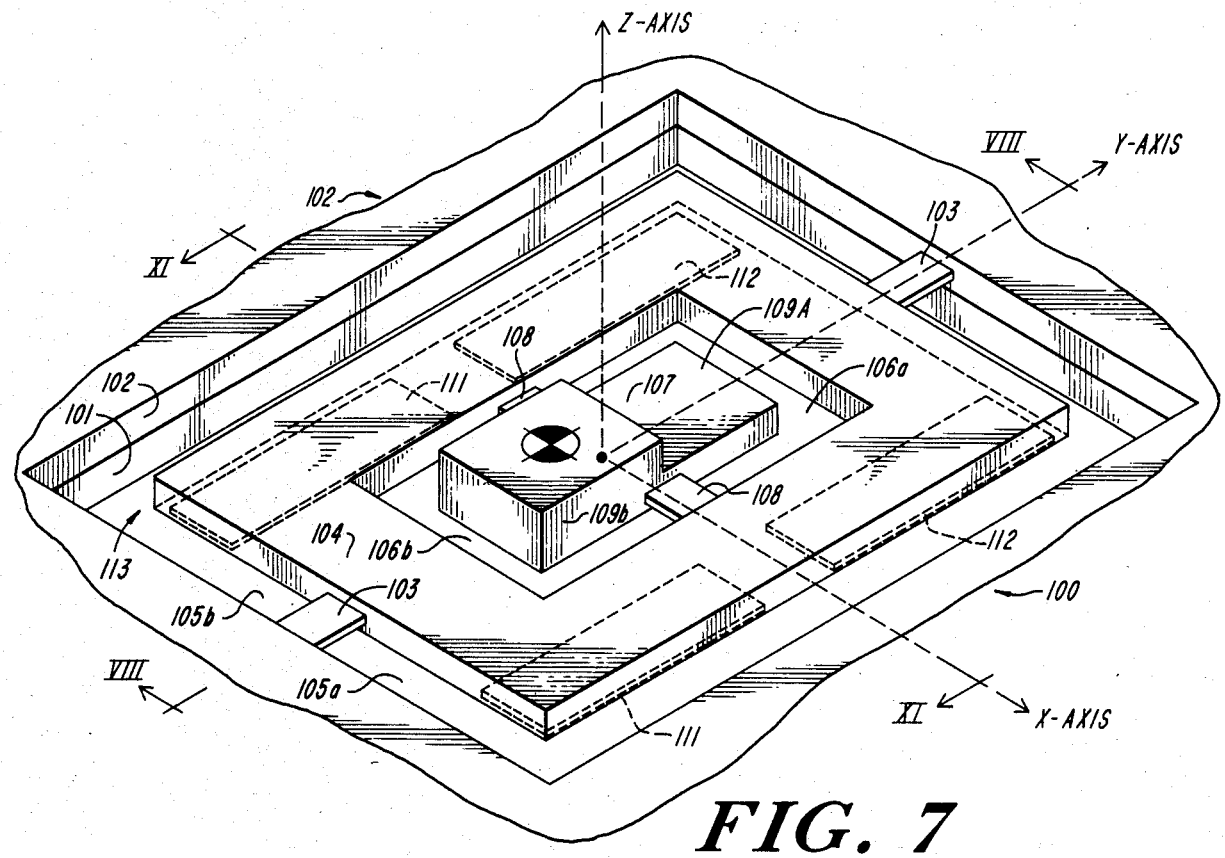
FIG. 7 is a top perspective view of an accelerometer transducer according to a preferred embodiment of the invention.

FIG. 7 shows a top perspective view of a preferred embodiment of an accelerometer transducer 100 according to the present invention having a basic mechanical structure in many ways similar to the sensor of FIG. 1. The transducer 100 is adapted to sense acceleration along an input axis, denoted the Z axis, and comprises a base 101 and a sheet 102. The base 101 supports peripheral regions of sheet 104 in a plane which is substantially normal to the input Z axis. Base 101 defines a tray-like recess 113 having opposed C-shaped aperture portions 105a, 105b in the nominal plane of sheet 102. The sheet member 102 includes a portion 104 interior to the region supported by base 101, with that portion 104 being suspended over the recess 113 by springs 103 aligned along an axis, denoted the Y axis, lying in the nominal plane of sheet 102. Springs 103 are leaf springs permitting torsional spring-limited motion of the portion 104 about the Y axis.

A further set of opposed C-shaped apertures 106a, 106b define inner sheet portion 107 interior to the sheet portion 104. Sheet portion 107 is suspended from sheet portion 104 by a pair of springs 108 oriented along an axis (denoted the X axis) in the nominal plane of the sheet 102 and orthogonal to the Y axis. Springs 108 are also torsional springs, permitting limited angular excursions of inner sheet portion 107 about the X axis. In the illustrated embodiment, the sheet portion 104 is mass-balanced with respect to the Y axis, and the inner sheet portion 107 has a mass imbalance with respect to its central (x) axis. As shown, sheet portion 107 has a thin end 109A and a thick end 109B. Preferably, sheet 102 and sheet portions 104, and 107 are formed from a single sheet, by removal of the material at apertures 105a, 105b, 106a, 106b and undercutting thereof to form recess 113. Alternatively, discrete components may be used to form elements 102, 103, 104, 107 and 108. In the single sheet embodiment, springs 103 and 108 are formed by doping or otherwise forming the spring bodies as thin etch-resistant regions when growing layers 102, 104, 107, so that the springs remain after undercutting of the sheet layer. The thick end 109B of inner sheet portion 107 is formed by depositing an additional thickness of material on one side of one end of the sheet portion 107, so as to imbalance that portion. As a result, the sheet portion 107, including ends 109A and 109B, is characterized by a center of gravity lying offset from the intersection point of the Y and Z axes, and offset from the nominal plane (Z=0) of the sheet 104.

In this embodiment, springs 103 and 108 are leaf springs having an relatively short length along their principal axes (Y and X, respectively). Consequently, those springs may be characterized as torsional springs, tending to restore the position of the respective sheet portion 104 and 107 when those portions undergo see-saw like excursions about the respective Y and X axes. Springs 103 and 108 do not deflect along their length to any appreciable extent. With this geometry, when sheet portion 104 oscillates about the Y axis, the sheet portion 107 is carried along because its suspension is orthogonal to the Y axis. Force directed along the Z axis, however, causes an imbalance in force distribution across the sheet portion 107, resulting in pendulous motion of sheet portion 107 about the X axis, changing the moment of inertia of the composite structure including sheet portions 104 and 107 and springs 103 and 108 along the Y axis. For example, a downwardly (as shown) directed acceleration along the Z axis moves the center of gravity of sheet portion 107 closer to the Y axis causing a change in moment of inertia. The structure consisting of sheet portion 104, springs 108, and sheet portion 107 has a characteristic or natural frequency of motion of about its suspension, springs 103. This frequency is a function of the moment of inertia of the structure 104, 107, 108 about axis Y. Consequently a motion of the center of gravity of sheet portion 107 toward the Y axis, decreasing the moment of inertia about the Y axis, increases the natural frequency of the system about the Y axis. This property is used in an accelerometer transducer according to the present invention by driving sheet 104 at its characteristic frequency and measuring deviations from that frequency caused by Z axis acceleration. Such variations are representative of acceleration along the Z axis and the consequent non-pendulous displacement of the center of gravity of sheet portion 107.

In the preferred embodiment shown, sheet portion 104 is driven by electrostatic drivers, comprising drive plates 111, shown in phantom underneath sheet portion 104. Drive plates 111 are preferably conductive metallic plates deposited on sheet portion 104 during fabrication. In the case that base member 101 is conductive, drive plates 111 may be deposited over a suitable insulating layer on sheet portion 104, in a position opposing an underneath surface of base 101. Conductive leads (not shown) are provided for supplying driving voltage at a frequency to drive sheet portion 104 in harmonic oscillation about its axis, as discussed above in relation to FIG. 1. Alternatively, sheet portion 104 may comprise conductive material, and electrodes corresponding to plate 111 may be imbedded in the base structure, suitably insulated, below sheet portion 104 for such driving. Capacitive pick-off plates 112 are deposited on the opposing end of sheet portion 104, and are operative, by motion with respect to corresponding pick-off electrodes, to develop a signal indicative of the actual frequency of motion of sheet portion 104.

In operation, then, sheet portion 104 is driven at its resonant frequency and a feed-back loop comprising capacitative pick-off electrodes 112 determines the actual driven frequency and compares it with the resonant frequency. In practice, the actual frequency may be measured by means other than a capacitative pick-off, for instance, by an optical reflection from its surface toward a photosensor. Similarly, sheet portion 104 may be driven by other than electrostatic means, for example, by a piezoelectric driving mechanism. Thus, several forms of drive means are suitable to drive sheet portion 104 at its resonant frequency so that variations from its "rest" or natural frequency may be monitored.

Figure 8:
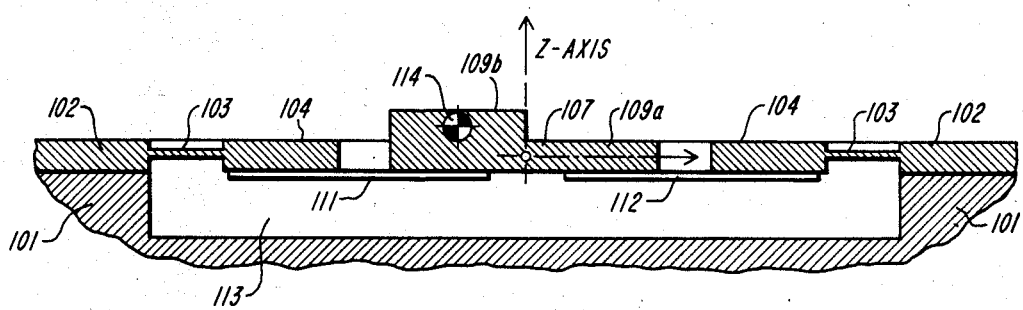
FIG. 8 is a vertical section along the Y axis of the embodiment of FIG. 7.

FIG. 8 shows a vertical section along the Y axis through the transducer of FIG. 7. As shown, upper face of the peripherally supported region of sheet 102, sheet portion 104 and sheet portion 107 all lie in substantially the same plane. Recess 113 in base 101 underlies all of sheet portions 104 and 107. In operation, of course, the sheet portions 104 and 107 will have oscillatory and acceleration induced excursions out of the nominal plane defined by the peripheral support. Plate 111, comprising a thin, metalized portion, is deposited below sheet portion 104 facing base 101 across the gap 113. The center of gravity 114 of sheet portion 107 lies slightly above the nominal plane of sheet 102.

Figure 9:
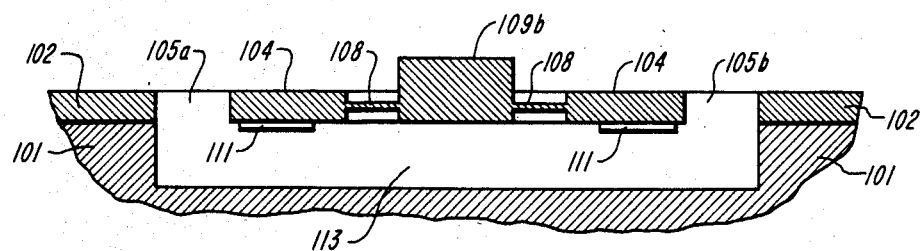
FIG. 9 is a vertical section along the X axis of the embodiment of FIG. 7.

FIG. 9 shows a vertical section along the X axis of the device of FIG. 7. As shown, the thick portion 109B of inner sheet portion 107 rises above the nominal plane of sheet 102.

It will be appreciated by those skilled in the art of inertial instrumentation that for small acceleration-induced motions of sheet portion 107 about axis X, the change in resonant frequency of the structure 104, 108, 107 will be approximately identical for upward and downward (as shown) accelerations, unless a bias is introduced by offsetting the center of gravity of the pendulum portion 107 above or below the Y axis, which makes the change in resonant frequency locally monotonic. In a system according to a preferred embodiment of the invention, the instrument is linearized by using two transducers similar to that of FIG. 7.

Figure 10:
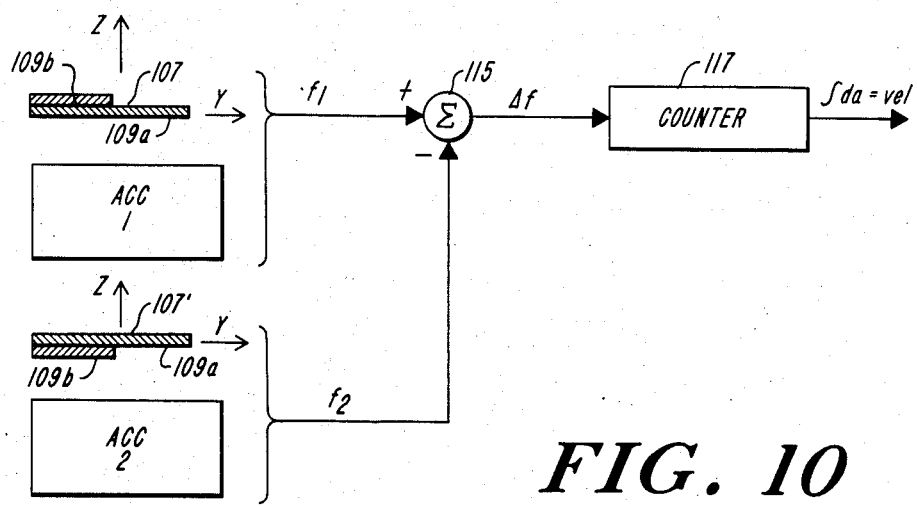
FIG. 10 is a schematic block diagram of an integrating accelerometer using plural transducers.

Such a device is shown schematically in FIG. 10 including two accelerometers ACC-1 and ACC-2. In FIG. 10, sheet portions are shown schematically for each of ACC-1 and ACC-2. The first transducer ACC-1 has its end 109B of sheet portion 107 with its center of gravity on a first side of the X-Y plane, i.e., upward in the direction of the Z axis. The second transducer ACC-2 has for its corresponding end 109B' the center of gravity on the opposite side of the X-Y plane, i.e., downward in the direction of the Z axis with respect to the sheet. This construction is indicated schematically in FIG. 10 by an extra sheet layer on the appropriate side of one end of sheet 107. The first transducer ACC-1, thus would have sheet portion 107 similar in appearance to that indicated by elements of 107, 109A and 109B of FIG. 8, a construction referred to herein as "biased up". The second transducer ACC-2, having corresponding elements 107', 109A, 109B' appears like the illustration of FIG. 8, except rotated 180 degrees about the Y axis. This latter configuration is denoted herein "biased down". According to the preferred embodiment, two such transducers are employed, one biased up and one biased down. This is indicated schematically in FIG. 10 in which accelerometer transducer ACC-1 has inner sheet 107 biased up, and accelerometer transducer ACC-2 has inner sheet 107' biased down.

Each of these devices is preferably manufactured with components otherwise having substantially identical characteristics, so that the resonant frequencies, masses, spring constants, and the like of the respective transducers are identical except for their direction of bias of the inner sheet portions 107 and 107' of the finished assembly. The sheet portions 104 (and 104') of each accelerometer device are driven at their respective resonant frequency, and a frequency pick-off sensor (not shown) is employed in a feedback circuit (not shown) to maintain that driving frequency. Changes in the resonant frequency due to motion of the inner sheets 107 and 107' are sensed by way of the pick-off sensors, and the changes in frequency of the two transducers (represented by signals $f_1$ and $f_2$ in FIG. 10) are subtracted from each other by a network 115. In this manner, the instrument output is essentially linearized, eliminating the second order terms of the frequency as a function of acceleration.

Preferably, the devices are fabricated at the same time on the same base, using semiconductor device fabrication techniques, and ancillary drive and logic circuitry is fabricated on the base at the same time. For each accelerometer, the frequency signal developed by the pick-off sensors is processed to develop an output signal in digital form, and the two output signals $f_1$ and $f_2$ are subtracted by being applied to an up-down counter 117, with the resultant output signal $\Delta f$ providing a direct measure of the acceleration.

The instrument of the preferred embodiment, as described above, is readily amenable to microminiaturization, since the instrument is a planar device which lends itself to semiconductor fabrication techniques. Moreover, because of the small dimensions of the resonant member, the resolution of the instrument may be greatly improved over that of existing structures. By way of example, a device in the form illustrated in FIG. 7 may include an inner sheet portion 107 having a length of 0.2 millimeters, with its center of gravity offset 0.008 millimeters above the center line of sheet portion 107. Springs 103 and 108 may have spring constants in the range of $K = 3 \times 10^{-11}$ newton-meters and the bar mass of sheet 107 approximately $5 \times 10^{-10}$ kilograms. With these dimensions, the characteristic frequency of the vibrating structure is 4415 hertz and the instrument sensitivity over consecutive measurement intervals detects changes in velocity of 0.1 centimeters per second.

Figure 11:
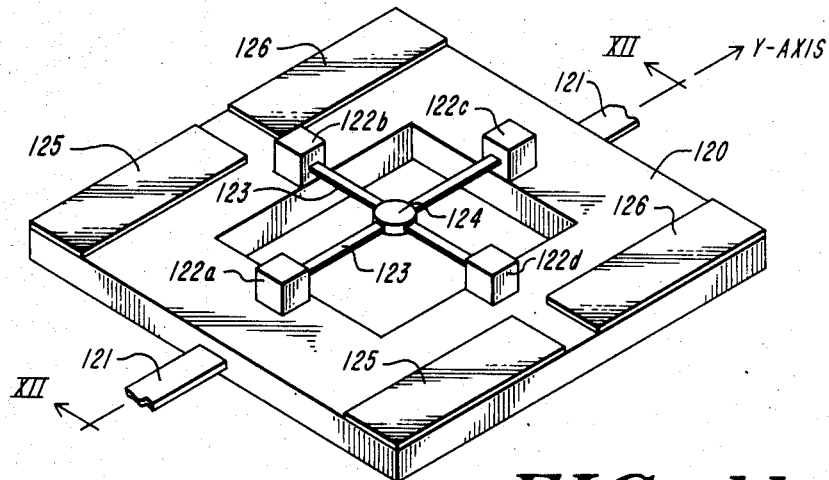
FIG. 11 is a top perspective view of another transducer according to the invention.

FIG. 11 shows an alternative embodiment of an accelerometer transducer according to the present invention. In this embodiment, a sheet member 120 is adapted to pivot around pivot springs 121 aligned along a central Y axis. Extending from one face of sheet 120 are a plurality of posts, 122a, 122b, 122c, 122d. Posts 122a, 122c, illustratively, are aligned along the Y axis. Posts 122b, 122d are aligned transverse thereto. Flexure beams 123 extend between opposing posts. A weight or proof mass 124 is centrally located at a junction of the flexure beams. Drive plates 125, corresponding to elements 111 of the previously discussed embodiment, are deposited on one surface of sheet 120, and pick-off plates 126, for sensing in a manner analogous to plates 112 of the embodiment of FIG. 7, are also deposited on sheet 120.

With its post and beam suspension, proof mass 124 moves in a straight line which, as shown, is approximately perpendicular to the plane of sheet 120. Proof mass 124 is offset from the Y axis of that plane by the posts 122a–122d, and accordingly, when subject to an acceleration along the Z axis will move further from or closer to axis Y, varying the moment of inertia of the structure and changing the resonant frequency of the sheet. As is the case for the embodiment of FIG. 7, the suspension of the weight outside the plane of the sheet results in an asymmetrical frequency vs. displacement curve, so that by subtracting the output of a "biased up" transducer from a "biased down" transducer an output directly proportional to acceleration may be developed.

Figure 12:
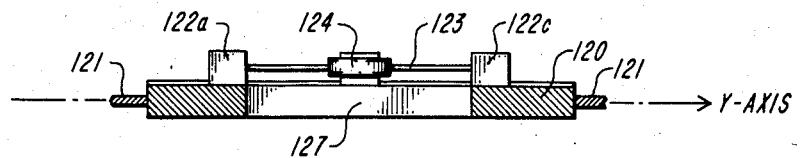
FIG. 12 is a section of the transducer of FIG. 11.

FIG. 12 shows a section along the Y axis of the device of FIG. 11. Posts 122a, 122c extend above the sheet 120, and flexure beams 123 extend from one post to the other. Proof mass 124 is suspended by beams 123 in the central aperture 127 of plate 120, and the net effect of the different cross beams 123 is to restrict the proof mass for motion substantially in a line perpendicular to the sheet. As before, motion along the input axis Z of the mass 124 results in a change of the resonant frequency of the vibrating sheet 120 about pivot springs 121 located on the Y axis.

The structure of the device shown in FIG. 11 may be generalized in several ways. In all such embodiments, a weight is mounted to a vibrating sheet by a suspension permitting motion along the input axis. The motion of the weight along the axis is functionally related to the magnitude of the input acceleration and affects the characteristic frequency of the vibrating sheet.

Figure 13:
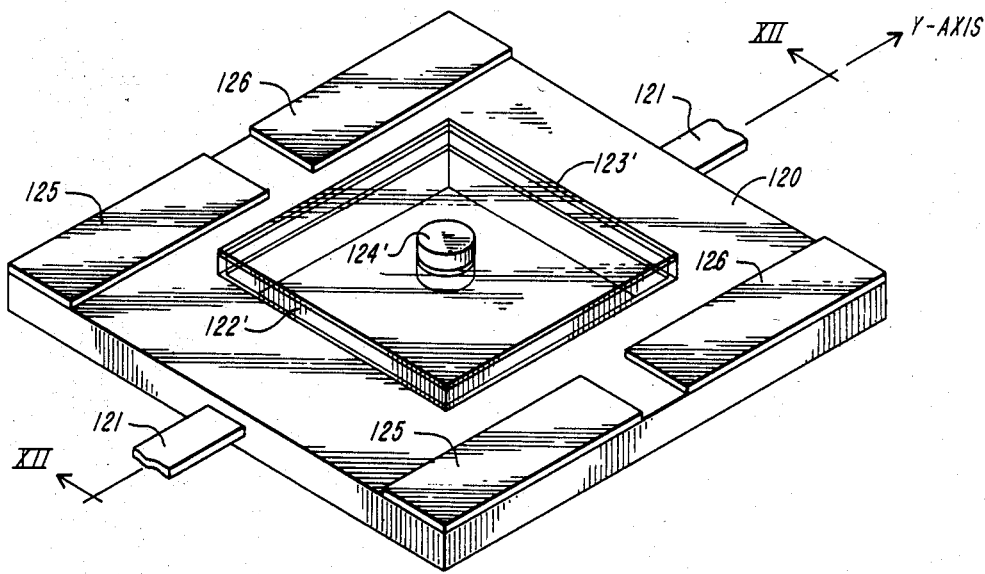
FIG. 13 is a top perspective view of a diaphragm-type transducer according to the invention.

According to the invention, the weight is offset along the input axis from an axis of vibrational rotation. According to a further aspect of the invention, two such devices are provided, each one having a weight suspended offset in a direction opposite that of the other, so that an acceleration along the input axis shifts the characteristic frequency in opposite senses for each of the two devices. The suspension of the weight from the sheet in the embodiment of FIG. 11 need not be by leaf springs or torsional springs. Indeed in the sectional view of FIG. 12, suspension 123 may be, a diaphragm, a net-like lattice, or a plurality of wires crossing at the weight to provide an appropriate suspension. FIG. 13 shows one such embodiment, in which a diaphragm 123' is offset from sheet 120 by a spacer 122' so as to space the diaphragm 123' and weight 124' from the sheet. In all such embodiments, the suspension carries the weight offset from the Y axis and restricted for motion substantially along the input axis. In this manner, the cross axis coupling of the device is maximized for directly manifesting the acceleration along the input axis.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraces therein.

What is claimed is:

1. Apparatus for sensing the magnitude of acceleration along an input axis, such apparatus comprising:
    a base, defining an opening transverse to the input axis;
    a sheet member, pivotally suspended from the base over the opening by at least one torsion spring for reciprocating angular motion about a first axis lying in the sheet member;
    a weight, having a center of gravity offset from the sheet member along an input axis;
    suspension means, suspending the weight to the sheet member for displacement with respect to the first axis, such displacement being responsive to acceleration along the input axis;
    the movable system consisting of the sheet member, the suspension means, the weight and the at least one torsion spring being characterized by a natural frequency of angular motion about the first axis, said natural frequency varying subject to displacement of the weight, whereby the natural frequency of angular motion of such movable system is representative of the acceleration along the input axis; and
    means for sensing said natural frequency.

2. A sensor according to claim 1, wherein the sheet member has an inner contour defining an aperture therein, and wherein the weight comprises a second sheet member suspended in the aperture, said second sheet member having a center of gravity offset from the first axis, and wherein the suspension means comprises at least one second torsional spring element suspending the second sheet member for torsional motion about a second axis orthogonal to the input axis and the first axis.

3. A sensor according to claim 1, wherein the suspension means comprises:
    post means attached to the sheet member and protruding therefrom; and
    beam means, extending from the post means to the weight, for permitting said displacement of the weight by deflection of the beam means.

4. A sensor according to claim 1, wherein the suspension means comprises:
    a diaphragm means, having the weight centrally located thereon, for permitting said displacement by deformation of the diaphragm; and
    spacer means attached to the sheet and to the diaphragm for holding said diaphragm means spaced apart from the sheet member.

5. A sensor according to claim 1, further including:
    means for driving the movable system at its natural frequency; and
    means for detecting the frequency of motion of the movable system.

6. A sensor according to claim 5, wherein the means for detecting includes means for counting pulses manifesting the frequency of motion.

7. An accelerometer assembly comprising a pair of first and second sensors according to claim 1, wherein the center of gravity of the weight of the first sensor is offset in a first direction along the input axis, and the center of gravity of the weight of the second sensor is offset from the sheet member of the second sensor in a direction opposite to the first direction along the input axis.

8. An accelerometer according to claim 7, further including:
    means for driving the respective movable systems of the first and second sensors at their respective natural frequencies, and
    means for detecting the frequency of motion of the respective movable systems.

9. An accelerometer according to claim 8, wherein the means for detecting includes:
    means for counting pulses manifesting the respective frequencies of motion of the movable members.

10. An accelerometer according to claim 9 or 1, wherein the spring, the sheet and the weight are fabricated as micromechanical structures by semiconductor fabrication techniques.

11. An accelerometer according to claim 10, further including:
control circuitry, integrally fabricated on the base, for driving the movable system and for detecting the frequency of motion thereof.

12. An accelerometer transducer for sensing acceleration along an input axis, comprising:
a base;
a first spring element;
a first sheet member having a nominal plane and mounted by the first spring element to the base for reciprocating angular motion about a first axis lying in the plane at a natural frequency of motion, said base and first spring element determining an orientation of the first sheet member orthogonal to the input axis;
a second member, mounted to the first member by a second spring element for movement responsive to acceleration along the input axis, such movement causing a change of moment of inertia about the first axis, whereby an acceleration along the input axis causes the natural frequency to change by a quantity representative of the acceleration; and
means for sensing said natural frequency.

13. A planar intertial sensor for manifesting acceleration along an input (Z) axis, comprising a sheet member and associated base member, said base member including means for supporting the peripheral region of said sheet member in a plane perpendicular to said input (Z) axis, said plane including a first (X) reference axis and a second (Y) reference axis, said first and second reference axes being mutually perpendicular and intersecting said input axis at a common point,
wherein said sheet member encloses a first pair of opposed C-shaped void regions and at least one second pair of opposed C-shaped void regions, the void regions of said first pair being larger that the void regions of said second pair, and said first pair of void regions being disposed symmetrically about said second axis and said common point, and said second pair of void regions being interior to the void regions of said first pair and being disposed symmetrically about axes parallel to said first axis when said sheet member lies in said plane,
wherein the portions of said sheet member interior to said first pair of void regions are spaced apart from said base member,
wherein the portion of said sheet member between opposed ends of the first pair of void regions is flexible about said second axis,
wherein the portion of said sheet member between opposed ends of the second pair of void regions is imbalanced about said first axis such that acceleration along the input axis changes the moment of inertia of the said portion of the sheet member about said second axis, and further including means for sensing changes in the moment of inertia.

14. A force responsive assembly for use in apparatus for sensing acceleration along an input axis associated with a base member comprising:
A. a force responsive member including a substantially planar sheet portion,
B. a torsion spring pivotally coupling said planar sheet portion to said base member whereby said planar sheet portion is adapted for reciprocating angular excursions from a reference plane perpendicular to said input axis about a first reference axis lying in said plane, wherein said force responsive member further includes a mass element and a means for coupling said mass element to said sheet portion at a distance which varies according to acceleration along the input axis so that said force responsive member is characterized by a moment of inertia about said reference axis which is a locally monotonic function of the acceleration of said base member along said input axis.

15. An assembly according to claim 14 further comprising means for driving said force responsive member in reciprocating angular excursions about said reference axis.

16. An assembly according to claim 15 further comprising a feedback control means for adaptively controlling the rate of said excursions to be at the natural frequency of angular motion of said force responsive member about said first reference axis, said rate being representative of the acceleration of said base member along said reference axis.

17. An assembly according to claim 14 wherein said mass element coupling means includes
a planar member and associated torsion spring, said associated torsion spring pivotally coupling said planar member to said planar sheet portion about a second reference axis orthogonal to said input axis and said first reference axis, and
means for supporting said mass element such that said mass element is offset from the principal plane of said planar member, and is offset from said input axis.

18. An assembly according to claim 14 wherein said mass element coupling means includes means for supporting said mass element such that said mass element is centered along said input axis and is offset from the principal plane of said planar portion by a distance which is a monotonic function of acceleration of said base member along said input axis.

19. An assembly according to claim 18 wherein said supporting means comprises a diaphragm supporting said mass element, and wherein said diaphragm is peripherally supported by said sheet portion.

20. An assembly according to claim 18 wherein said supporting means comprises a plurality of deflection springs aligned in a plane parallel to the principal plane of said sheet portion, all of said springs being affixed at one end thereof to said mass element, and affixed at the other end thereof to support members extending from said sheet portion.

* * * * *